United States Patent
Kim (10) Patent No.: US 10,151,098 B2
(45) Date of Patent: Dec. 11, 2018

(54) POWERLESS BACK-FLOW PREVENTION APPARATUS

(71) Applicant: KOREA MACHINERY IND. INC., Hwaseong-si (KR)

(72) Inventor: Jongsun Kim, Bucheon-si (KR)

(73) Assignee: KOREA MACHINERY IND. INC., Hwaseong-si (KR)

( * ) Notice: Subject to any disclaimer, the term of this patent is extended or adjusted under 35 U.S.C. 154(b) by 125 days.

(21) Appl. No.: 15/317,574

(22) PCT Filed: Jul. 13, 2015

(86) PCT No.: PCT/KR2015/007238
§ 371 (c)(1),
(2) Date: Dec. 9, 2016

(87) PCT Pub. No.: WO2016/010316
PCT Pub. Date: Jan. 21, 2016

(65) Prior Publication Data
US 2017/0107711 A1   Apr. 20, 2017

(30) Foreign Application Priority Data
Jul. 14, 2014 (KR) .......................... 10-2014-0088543

(51) Int. Cl.
*E03F 5/042* (2006.01)
*E03F 7/04* (2006.01)
(Continued)

(52) U.S. Cl.
CPC ............... *E03F 5/042* (2013.01); *E03F 7/04* (2013.01); *F16K 15/03* (2013.01); *F16K 31/22* (2013.01);
(Continued)

(58) Field of Classification Search
CPC .. E03F 5/042; E03F 7/04; F16K 15/03; F16K 31/22; F16K 31/28
See application file for complete search history.

(56) References Cited

U.S. PATENT DOCUMENTS 3,974,654 A * 8/1976 Mirto, Jr. ................ E02B 8/045
                                                       137/409
4,117,860 A * 10/1978 Carlin ...................... A62C 33/00
                                                       137/513.5
(Continued)

FOREIGN PATENT DOCUMENTS

DE      29719374 U1    2/1998
DE   202004010448 U1  11/2004
(Continued)

*Primary Examiner* — Craig Schneider
*Assistant Examiner* — Frederick D Soski
(74) *Attorney, Agent, or Firm* — KORUS Patent, LLC; Seong Il Jeong (57) ABSTRACT

There is provided a powerless back-flow prevention apparatus comprising: a body having a sewage inlet at a front thereof, a sewage outlet at a rear thereof, and a length-wise sewage channel there between; a door pivotally coupled to the body at the rear thereof to open or close the outlet, wherein the door comprises: a number of floating members arranged spacedly with each other; and a guide disposed on the floating members to pivot upwards via the floating force to close the outlet, and to pivot downwards via a gravity in an absence of the sewage back-flow to open the outlet, and, then to guide the sewage from the outlet.

10 Claims, 5 Drawing Sheets

(51) Int. Cl.
*F16K 15/03* (2006.01)
*F16K 31/22* (2006.01)
*F16K 31/28* (2006.01)

(52) U.S. Cl.
CPC ......... *F16K 31/28* (2013.01); *Y10T 137/7481* (2015.04); *Y10T 137/7485* (2015.04); *Y10T 137/7903* (2015.04); *Y10T 137/7908* (2015.04); *Y10T 137/7909* (2015.04)

(56) References Cited

U.S. PATENT DOCUMENTS

| | | | | |
|---|---|---|---|---|
| 5,406,972 | A * | 4/1995 | Coscarella | ................ E03F 7/04 137/315.08 |
| 7,101,114 | B1 | 9/2006 | Waters, Jr. | |
| 2001/0035648 | A1 * | 11/2001 | Coscarella | ............. A61K 45/06 285/148.11 |
| 2004/0007265 | A1 * | 1/2004 | Coscarella | ............ F16K 3/0218 137/315.41 |
| 2009/0185864 | A1 | 7/2009 | Waters, Jr. | |
| 2010/0078083 | A1 * | 4/2010 | Coscarella | .............. F16K 15/03 137/527 |
| 2012/0279586 | A1 | 11/2012 | Kim | |
| 2015/0107698 | A1 * | 4/2015 | Coscarella | ................ E03F 7/04 137/424 |

FOREIGN PATENT DOCUMENTS

| | | |
|---|---|---|
| EP | 1239091 A2 | 9/2002 |
| JP | H10-018405 A | 1/1998 |
| JP | 2011-510194 A | 3/2011 |
| JP | 2013-515884 A | 5/2013 |
| KR | 10-0525160 B1 | 11/2005 |
| KR | 10-0827566 B1 | 5/2008 |
| KR | 10-0835335 B1 | 6/2008 |
| KR | 10-2011-0072887 A | 6/2011 |
| KR | 10-2014-0065368 A | 5/2014 |

* cited by examiner

POWERLESS BACK-FLOW PREVENTION APPARATUS

FIELD OF THE PRESENT DISCLOSURE

The present disclosure relates to a powerless back-flow prevention apparatus to prevent sewage or water from back-flow.

DISCUSSION OF THE RELATED ART

Generally, sewage may be discharged from a residence facility, agricultural facility, public facility or industrial facility and then may be passed to a sewage treatment facility.

The sewage treatment facility may be coupled to a sewage pipe with an optimum size to the sewage source.

During discharging the sewage, there may occur rainfalls to increase sewage flow rate and thus the sewage flow rate may exceed the pipe capacity. In this connection, the sewage pipe may not have a free space and may be full with the sewage.

Thus, the sewage may overflow toward the street or road or ground surface. Further, the sewage pipe may have an increased water pressure therein. Thus, the sewage may back-flow toward a sewage pipe at a lower installation level. In this connection, the sewage may back-flow toward the residence facility, agricultural facility, public facility or industrial facility. This back-flow may damage the facilities.

Further, due to heavy rainfalls, a water surface level of a river may sharply increase. Thus, great amount of sewage may flow from a sewage pipe at a higher ground level to a sewage pipe at a lower ground level. Thus, the sewage may back-flow toward the residence facility, agricultural facility, public facility or industrial facility. This back-flow may damage the facilities.

In order to suppress the damage due to the sewage back-flow, various sewage back-flow prevention apparatus have been employed. For example, Korean patent application publication number 10-2008-0078974 disclose a sewage back-flow prevention apparatus.

In a conventional back-flow prevention apparatus including the disclosed one, a door may be opened or closed using a power or a water pressure. Thus, when the sewage flow rate is small, the door may not be opened or closed. Thus, there may occur a sewage back-flow.

Further, the door may interfere with the sewage flow. Further, a connection pipe of the apparatus may not have a completely-open type. Thus, contaminants with a large length or volume may be not discharged out of the pipe.

When the door closes a water channel, contaminants such as sands, wastes, etc. may enter into between the door and the connection pipe, to interface with the operation of the door.

SUMMARY

Thus, the present disclosure provides a powerless back-flow prevention apparatus wherein, using the door with a number of the floating members, the outlet in the body may be opened or closed. The floating members may be easily repaired or may be easily replaced. Further, the present back-flow prevention apparatus may be suitable for the lager diameter tube structure and thus for the discharge of a large amount of sewage.

Further, the present disclosure provides a powerless back-flow prevention apparatus wherein, beneath the door, the contaminant storage may be formed to collect the external contaminant, and, thus, the contaminants may be prevented from back-flow.

Furthermore, the present disclosure provides a powerless back-flow prevention apparatus wherein, using each length variable member and each side blocking portion in each lateral side of the door, the door may be easily opened or closed and, at the same time, the contaminants may be prevented from entering into between the door and body.

In one aspect, there is provided a powerless back-flow prevention apparatus comprising: a body having a sewage inlet at a front thereof, a sewage outlet at a rear thereof, and a length-wise sewage channel there between; a door pivotally coupled to the body at the rear thereof to open or close the outlet, wherein the door comprises: a number of floating members arranged spacedly with each other, each floating member being configured to generate a floating force using a back-flow of sewage toward the outlet; and a guide disposed on the floating members to pivot upwards via the floating force to close the outlet, and to pivot downwards via a gravity in an absence of the sewage back-flow to open the outlet, and, then to guide the sewage from the outlet, wherein the guide comprises: a guide plate disposed on the floating members to guide the sewage from the outlet; and side blocking plates extending upwards from the guide plate at both side ends thereof respectively to guide the sewage from the outlet, wherein the apparatus further comprises a contaminant storage to collect therein external contaminants.

In one implementation, the floating members are equidistantly spaced from each other.

In one implementation, a shock buffer is disposed between adjacent floating members, and each floating member has an empty space therein.

In one implementation, the guide plate and the side blocking plates are monolithic.

In one implementation, the guide further comprises length variable members, wherein each length variable member has a first side coupled to one lateral side of the guide plate, and a second side opposite the first side, coupled to one lateral side of the body, wherein each length variable member is configured to retract when the guide plate closes the outlet and to expand when the guide plate opens the outlet.

In one implementation, the inlet has an inlet plane normal to the length-wise sewage channel, and the outlet has an outlet plane tilted relative to the length-wise sewage channel in a predetermined angle, wherein the inlet portion has an edge having a coupling member disposed along the edge, wherein the coupling member has coupling holes formed therein. Each floating member has a floating-force generation material filled therein.

Thus, in the present disclosure, using the door with a number of the floating members, the outlet in the body may be opened or closed. The floating members may be easily repaired or may be easily replaced. Further, the present back-flow prevention apparatus may be suitable for the lager diameter tube structure and thus for the discharge of a large amount of sewage.

Further, in the present disclosure, beneath the door, the contaminant storage may be formed to collect the external contaminant. Thus, the contaminants may be prevented from back-flow.

Furthermore, in the present disclosure, using each length variable member and each side blocking portion in each lateral side of the door, the door may be easily opened or closed and, at the same time, the contaminants may be prevented from entering into between the door and body.

DETAILED DESCRIPTIONS

Hereinafter, embodiments of the present disclosure will be described in details with reference to attached drawings.

In general, a suffix such as "module" and "unit" may be used to refer to elements or components. Use of such a suffix herein is merely intended to facilitate description of the specification, and the suffix itself is not intended to give any special meaning or function.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
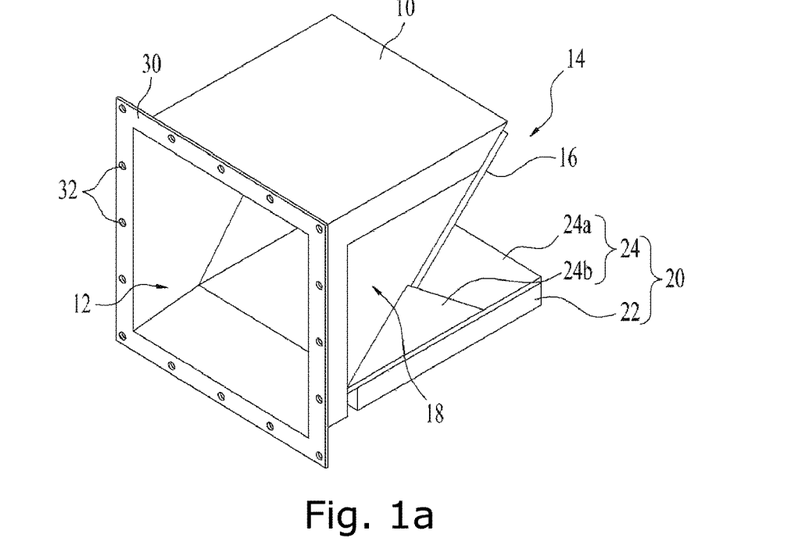
FIG. 1A to FIG. 1C show a powerless back-flow prevention apparatus in accordance with embodiments of the present disclosure.
Figure 1B:
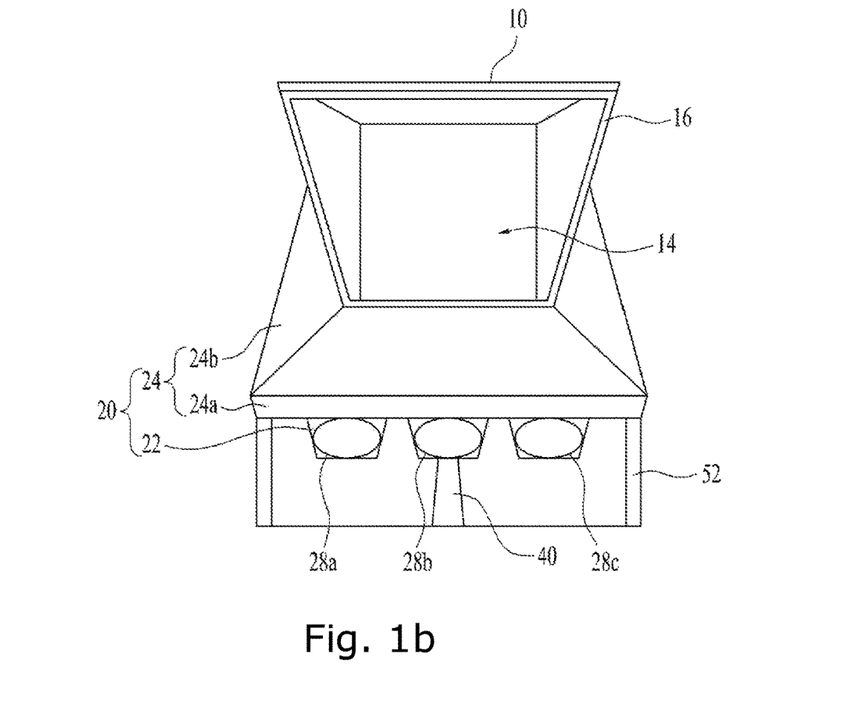
Figure 1C:
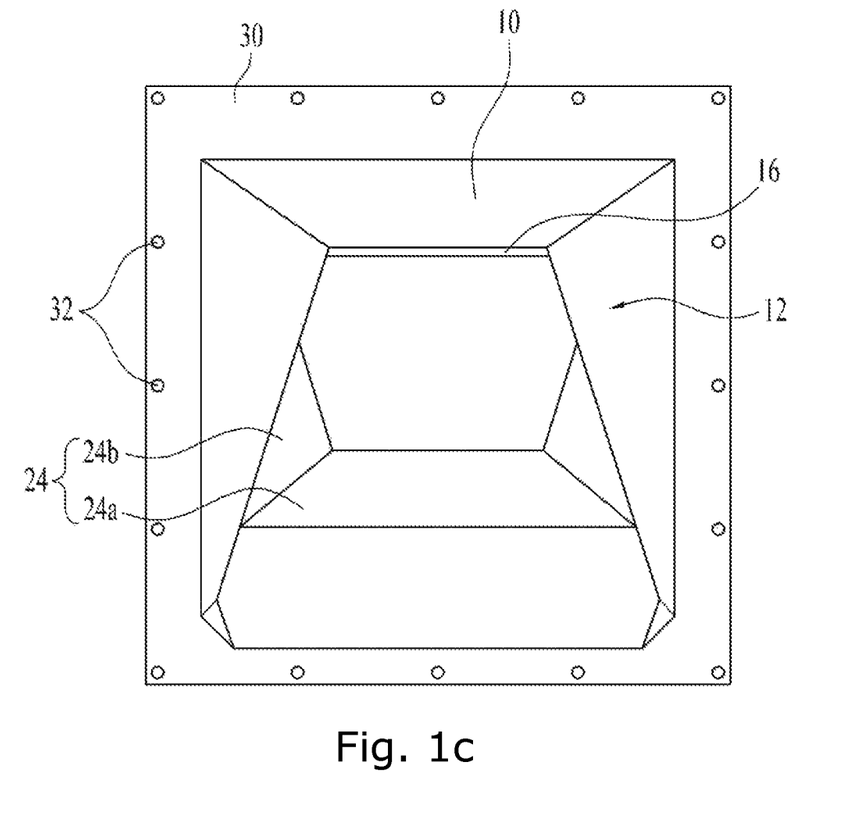

FIG. 1A to FIG. 1C show a powerless back-flow prevention apparatus in accordance with embodiments of the present disclosure. FIG. 1A shows a perspective view of a powerless back-flow prevention apparatus in accordance with one embodiment of the present disclosure; FIG. 1B shows a rear-side view of a powerless back-flow prevention apparatus in accordance with another embodiment of the present disclosure; and FIG. 1C shows a front side view of the powerless back-flow prevention apparatus of FIG. 1A.

As shown in FIG. 1A to FIG. 1C, the powerless back-flow prevention apparatus may include a body 10 and a door 20.

In this connection, the body 10 may have a sewage inlet 12 at a front, a sewage outlet 14 at a rear, and a length-wise sewage channel there between.

The inlet 12 may have an inlet plane normal to the length-wise sewage channel. The outlet 14 may have an outlet plane tilted relative to the length-wise sewage channel in a predetermined angle.

In one example, the predetermined angle may be between about 20 and about 80.

The angle may facilitate the opening or closing operation of the outlet 14 by the door 20.

The outlet 14 portion may have an edge having a shock buffer 16 formed along the edge.

The shock buffer 16 may act to buffer a shock between the door 20 and body 10 and, at the same time, to seal there between to suppress the sewage back-flow there between when the door 20 closes the outlet 14.

The body 10 may have a seat groove 18 formed therein to receive the door 20 when the door 20 closes the outlet 14.

The seat groove 18 may facilitate the opening or closing operation of the outlet 14 by the door 20.

The seat groove 18 may receive therein a side blocking portion or a length variable member of a guide of the door 10 when the door 20 closes the outlet 14.

This will be described in details later.

The inlet 12 portion may have an edge having a coupling member 30 disposed along the edge. The coupling member 30 may have coupling holes 32 formed therein.

The coupling member 30 may be coupled to a large hollow structure such as a large diameter pipe.

The door 20 may have a hinge to allow a pivot movement thereof. The hinge may be provided at the outlet 14 portion.

The door 20 may have a number of floating members 22 spacedly arranged from each other. The floating members 22 may allow the door 20 to be floated by the back-flow sewage toward the outlet 14. The door may have a guide 24 disposed on the number of floating members 22. Thus, when the floating members 22 float by the back-flow sewage toward the outlet 14, the guide 24 may pivot upward to close the outlet 14. When the back-flow is removed, the guide 24 may pivot downward by a gravity to open the outlet 14. Thus, the sewage may flow from the inlet 12 to the outlet 14. Then, the sewage may be guided by the guide 24.

The floating members 22 may be made of only a floating material. Alternatively, each of the floating members 22 may have a body and a rubber hollow tube 28a, 28b, or 28c disposed in the body, as shown in FIG. 1B.

The tube 28a, 28b, or 28c may be disposed in each of the floating members 22. Alternatively, the tube may be disposed only in some of the floating members 22.

When the floating members 22 have the tube 28a, 28b, 28c respectively or partially, the floating function may work even when the body of the floating members 22 may be damaged.

In this way, the door 20 may employ the number of floating members 22. This may allow easy replacement of the floating members 22. Further, when one of the floating members 22 does not work well, the rest of the floating members 22 may work to prevent the sewage back-flow.

Otherwise, when the floating member 22 is singular, the sewage back-flow may not be suppressed when the single floating member 22 may be damaged not to work well. Thus, the powerless back-flow prevention apparatus may not prevent the sewage back-flow. In this connection, the door 20 should be entirely replaced, or the powerless back-flow prevention apparatus should be replaced.

Therefore, the door 20 may employ the number of floating members 22. Thus, when one of the floating members 22 does not work well, the rest of the floating members 22 may work to prevent the sewage back-flow.

A number of the floating members 22 may be equidistantly spaced from each other.

In an alternative, if necessary, a number of the floating members 22 may be non-equidistantly spaced from each other.

This may provide installation freedom based on an installation location, environment, etc. of the powerless back-flow prevention apparatus.

Further, a number of the floating members 22 may have the same size.

In an alternative, if necessary, a number of the floating members 22 may have different sizes.

This may provide installation freedom based on an installation location, environment, etc. of powerless back-flow prevention apparatus.

Thus, the spacing and sizes of the floating members 22 may vary based on the installation location, environment, etc. In this way, the powerless back-flow prevention apparatus may be installed in various sites.

If necessary, between adjacent floating members 22, a shock buffer may be disposed.

This shock buffer may suppress foreign materials from entering into between the adjacent floating members 22, and, further, may suppress the floating members 22 from being damaged.

In an alternative, each floating member 22 may employ an empty space.

The empty space may receive an air therein. In an alternative, the empty space may receive various floating gases therein.

In an alternative, the empty space may be in a vacuum state.

In an alternative as described above, each floating member 22 may have each tube 28a, 28b, 28c disposed therein.

The tube 28a, 28b, or 28c may be disposed in each of the floating members 22. Alternatively, the tube may be disposed only in some of the floating members 22.

Beneath the door 20, a contaminant storage may be formed to collect external contaminants.

The contaminant storage may be divided via a number of partition walls 52 into a number of contaminant sub-storages. The number of partition walls 52 may support the door 20.

A number of the partition walls 52 may be equidistantly spaced from each other in a width direction of the body 10. Each partition wall 52 may extend in the direction of the length-wise sewage channel.

Further, a number of partition wall 52 may be alternated with the floating members 22.

In an alternative, in the contaminant storage, support walls to support both sides of the door 20 at the floating members thereof may be disposed.

In an alternative, in the contaminant storage, each support 40 may be formed to support each floating member 22.

Each the support 40 may support each floating member 22. Thus, the support 40 may be plural. In an alternative, a single support may support all or some of the floating members 22.

The support 40 mac act as a reference point when each floating member 22 pivots downward.

The guide 24 may include a guide plate 24a contacting a number of the floating members 22 to guide the sewage discharge, and both side blocking portions 24b vertically upwardly protruding from the guide plate 24a at both side ends thereof respectively to guide the sewage discharge.

The guide plate 24a and both side blocking portions 243 may be integrated with each other or may be separate.

Alternatively, the guide 24 may include both length variable members, each member having one end coupled to one lateral floating member 22 and the other end coupled to one lateral side of the body 10. Each length variable member may be configured to retract when the floating members 22 pivot upwards to close the outlet 14 and to expand when the floating members 22 pivot downwards to open the outlet 14.

In this connection, the length variable member may include an elastic member or stretchable member or foldable member or wrinkle-type flexible member, etc.

In one embodiment, the guide 24 may include a guide plate 24a contacting a number of the floating members 22 to guide the sewage discharge, and both side blocking portions 24b vertically upwardly protruding from the guide plate 24a at both side ends thereof respectively to guide the sewage discharge, and both length variable members, each member having one end coupled to one lateral side of the guide plate 24a and the other end coupled to one lateral side of the body 10. Each length variable member may be configured to retract when the guide plate 24a pivots upwards to close the outlet 14 and to expand when the guide plate 24a pivots downwards to open the outlet 14.

In this connection, the length variable member may cover the side blocking portions 24b of the guide 24 to suppress contaminant invasion.

Thus, in the present disclosure, using the door with a number of the floating members, the outlet in the body may be opened or closed. The floating members may be easily repaired or may be easily replaced. Further, the present back-flow prevention apparatus may be suitable for the lager diameter tube structure and thus for the discharge of a large amount of sewage.

Further, in the present disclosure, beneath the door, the contaminant storage may be formed to collect the external contaminant. Thus, the contaminants may be prevented from back-flow.

Figure 2A:
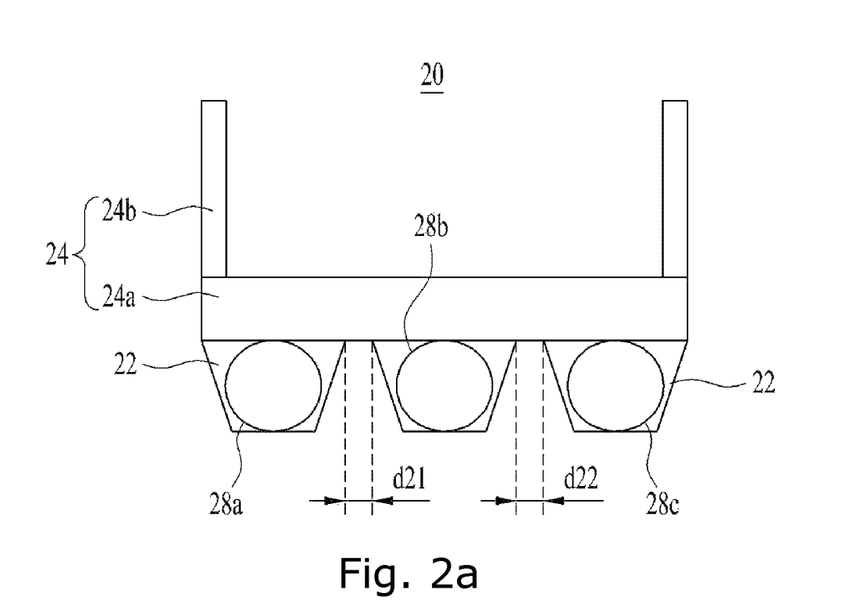
FIG. 2A shows a rear-side view of a door where floating members are equidistantly spaced from each other.
Figure 2B:
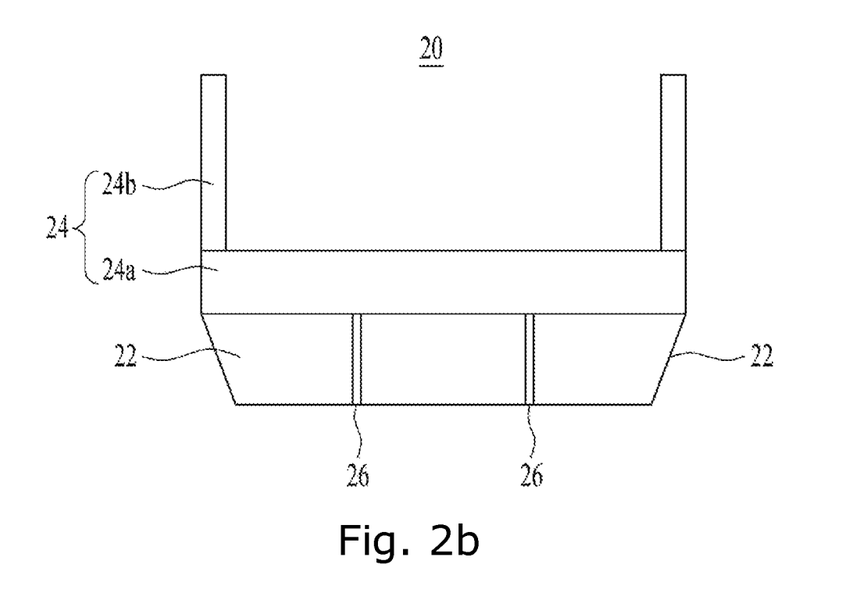
FIG. 2B shows a rear-side view of a door where a shock buffer is disposed between adjacent floating members in one embodiment of the present disclosure.

FIG. 2A shows a rear-side view of a door where floating members are equidistantly spaced from each other; and FIG. 2B shows a rear-side view of a door where a shock buffer is disposed between adjacent floating members in one embodiment of the present disclosure.

As shown in FIG. 2A and FIG. 2B, the door 20 may be pivotally coupled to the body at the outlet portion to open or close the outlet.

In this connection, the door 20 may have a number of floating members 22 spacedly arranged from each other. The floating members 22 may allow the door 20 to be floated by the back-flow sewage toward the outlet 14. The door may have a guide 24 disposed on the number of floating members 22. Thus, when the floating members 22 float by the back-flow sewage toward the outlet 14, the guide 24 may pivot upward to close the outlet 14. When the back-flow is removed, the guide 24 may pivot downward by a gravity to open the outlet 14. Thus, the sewage may flow from the inlet 12 to the outlet 14. Then, the sewage may be guided by the guide 24.

The floating members 22 may be made of only a floating material. Alternatively, each of the floating members 22 may have a body and a rubber hollow tube 28a, 28b, or 28c disposed in the body, as shown in FIG. 1B.

The tube 28a, 28b, or 28c may be disposed in each of the floating members 22. Alternatively, the tube may be disposed only in some of the floating members 22.

When the floating members 22 have the tube 28a, 28b, 28c respectively or partially, the floating function may work even when the body of the floating members 22 may be damaged.

The guide 24 may include a guide plate 24a contacting a number of the floating members 22 to guide the sewage discharge, and both side blocking portions 24b vertically upwardly protruding from the guide plate 24a at both side ends thereof respectively to guide the sewage discharge.

The guide plate 24a and both side blocking portions 24b may be integrated with each other or may be separate.

As shown in FIG. 2A, the floating members 22 may be equidistantly spaced from each other.

In one example, a spacing d21 between a middle floating member 22 and a left floating member 22 may be the same as the spacing d22 between the middle floating member 22 and a right floating member 22.

In an alternative, if necessary, a number of the floating members 22 may be non-equidistantly spaced from each other.

In one example, a spacing d21 between a middle floating member 22 and a left floating member 22 may be different from the spacing d22 between the middle floating member 22 and a right floating member 22.

This may provide installation freedom based on an installation location, environment, etc. of the powerless back-flow prevention apparatus.

Further, a number of the floating members 22 may have the same size.

In an alternative, if necessary, a number of the floating members 22 may have different sizes.

This may provide installation freedom based on an installation location, environment, etc. of powerless back-flow prevention apparatus.

Thus, the spacing and sizes of the floating members 22 may vary based on the installation location, environment, etc. In this way, the powerless back-flow prevention apparatus may be installed in various sites.

In an alternative, each floating member 22 may employ an empty space.

The empty space may receive an air therein. In an alternative, the empty space may receive various floating gases therein.

In an alternative, the empty space may be in a vacuum state.

In an alternative as described above, each floating member 22 may have each tube 28a, 28b, 28c disposed therein. The tube may be made of a rubber material.

The tube 28a, 28b, or 28c may be disposed in each of the floating members 22. Alternatively, the tube may be disposed only in some of the floating members 22.

As shown in FIG. 2B, between adjacent floating members 22, a shock buffer 26 may be disposed.

This shock buffer 26 may suppress foreign materials from entering into between the adjacent floating members 22, and, further, may suppress the floating members 22 from being damaged.

In this way, the door 20 may employ the number of floating members 22. This may allow easy replacement of the floating members 22. Further, when one of the floating members 22 does not work well, the rest of the floating members 22 may work to prevent the sewage back-flow.

Otherwise, when the floating member 22 is singular, the sewage back-flow may not be suppressed when the single floating member 22 may be damaged not to work well. Thus, the powerless back-flow prevention apparatus may not prevent the sewage back-flow. In this connection, the door 20 should be entirely replaced, or the powerless back-flow prevention apparatus should be replaced.

Thus, in the present disclosure, using the door with a number of the floating members, the outlet in the body may be opened or closed. The floating members may be easily repaired or may be easily replaced. Further, the present back-flow prevention apparatus may be suitable for the lager diameter tube structure and thus for the discharge of a large amount of sewage.

Figure 3A:
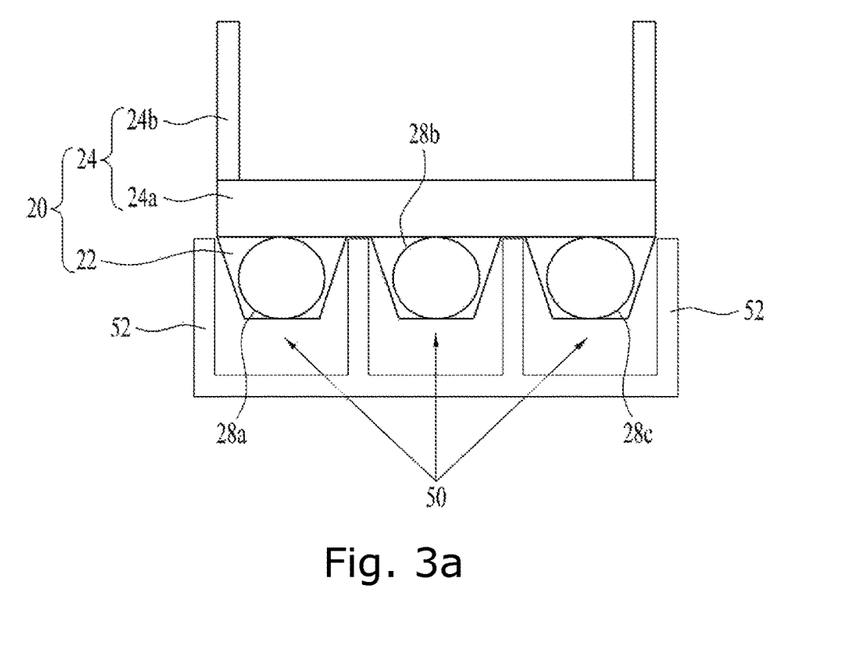
FIG. 3A and FIG. 3B show a rear-side view of a door including a contaminant storage in one embodiment of the present disclosure.
Figure 3B:
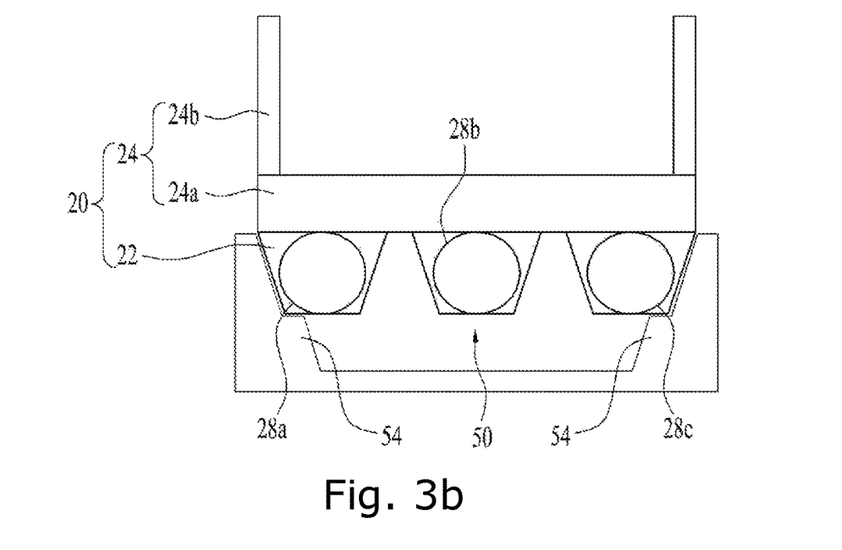

FIG. 3A and FIG. 3B show a rear-side view of a door including a contaminant storage in one embodiment of the present disclosure.

As shown in FIG. 3A and FIG. 3B, beneath the door 20, a contaminant storage 50 may be formed to collect external contaminants.

As shown in FIG. 3A, the contaminant storage 50 may be divided via a number of partition walls 52 into a number of contaminant sub-storages. The number of partition walls 52 may support the door 20.

A number of the partition walls 52 may be equidistantly spaced from each other in a width direction of the body 10. Each partition wall 52 may extend in the direction of the length-wise sewage channel.

Further, a number of partition wall 52 may be alternated with the floating members 22.

In an alternative, as shown in FIG. 3B, in the contaminant storage 50, support walls 54 to support the floating members 22 respectively may be disposed.

In one embodiment, the support walls 54 may at least partially support the guide 24 or floating member 22.

In an alternative, in the contaminant storage 50, each support 40 may be formed to support each floating member 22.

Each the support 40 may support each floating member 22. Thus, the support 40 may be plural. In an alternative, a single support may support all or some of the floating members 22.

The support 40 mac act as a reference point when each floating member 22 pivots downward.

The partition walls 52 or support walls 54 in the contaminant storage 50 may not only support the powerless back-flow prevention apparatus including the door and body but also prevent the contaminant collision to suppress the damage of the floating members 22.

Further, the partition walls 52 or support walls 54 in the contaminant storage 50 may be selectively installed based on an installation site or environment of the powerless back-flow prevention apparatus.

In this way, in the present disclosure, the contaminant storage 50 beneath the door 20 may collect external contaminants and thus may prevent the external contaminants from the back flow.

Figure 4A:
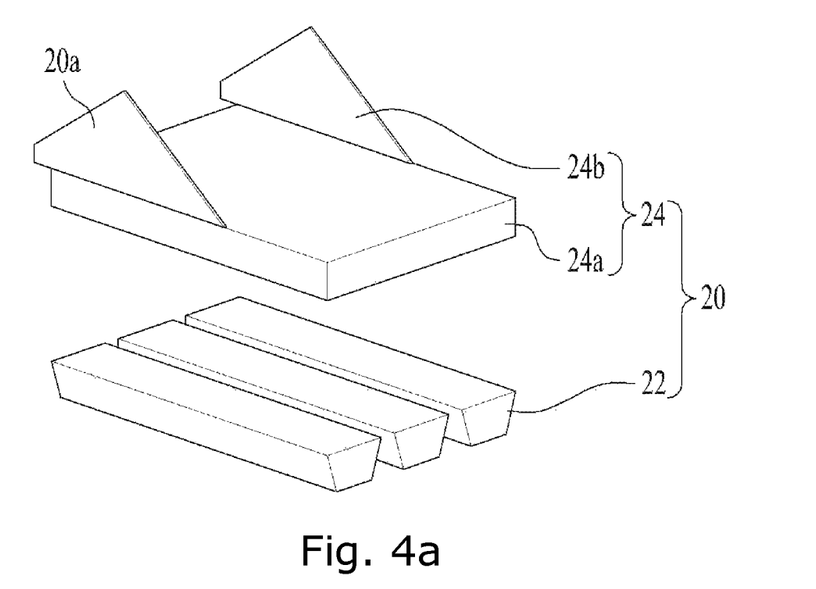
FIG. 4A and FIG. 4B show a guide in accordance with one embodiment of the present disclosure.
Figure 4B:
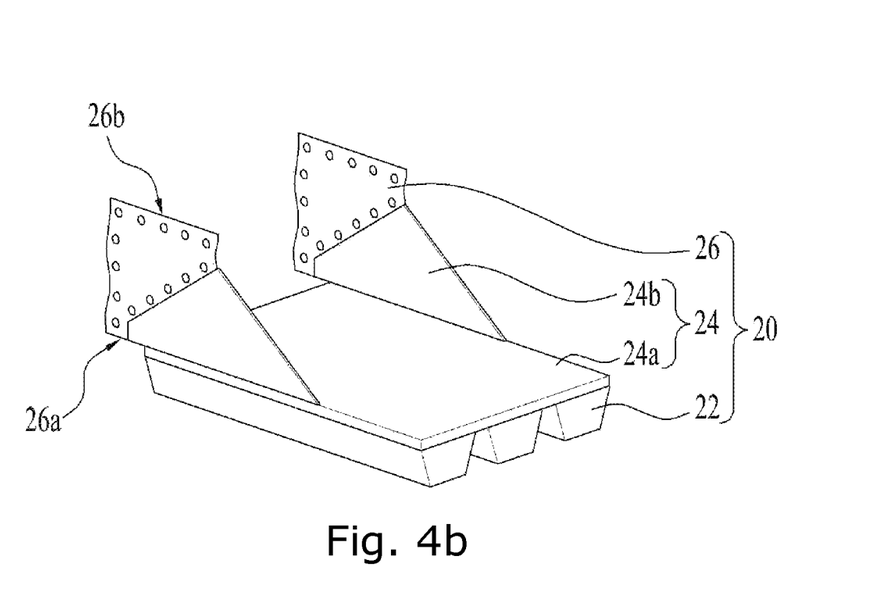

FIG. 4A and FIG. 4B show a guide in accordance with one embodiment of the present disclosure.

As shown in FIG. 4A and FIG. 4B, the door 20 may have a hinge to allow a pivot movement thereof. The hinge may be provided at the outlet 14 portion.

As shown in FIG. 4A, the door 20 may have a number of floating members 22 spacedly arranged from each other. The floating members 22 may allow the door 20 to be floated by the back-flow sewage toward the outlet 14. The door may have a guide 24 disposed on the number of floating members 22. Thus, when the floating members 22 float by the back-flow sewage toward the outlet 14, the guide 24 may pivot upward to close the outlet 14. When the back-flow is removed, the guide 24 may pivot downward by a gravity to open the outlet 14. Thus, the sewage may flow from the inlet 12 to the outlet 14. Then, the sewage may be guided by the guide 24.

The guide 24 may include a guide plate 24a contacting a number of the floating members 22 to guide the sewage discharge, and both side blocking portions 24b vertically upwardly protruding from the guide plate 24a at both side ends thereof respectively to guide the sewage discharge.

In one example, the guide plate 24a and both side blocking portions 24b may be integrated with each other or may be separate.

When the guide plate 24a and both side blocking portions are integrated with each other, the integrated with each other may be monolithic.

For example, both of the guide plate 24a and both side blocking portions may be made of the same metal.

For example, all of the guide plate 24a and both side blocking portions and the floating members 22 may be made of the same material.

Alternatively, the guide 24 may include both length variable members 26, each member having one end 26a coupled to one lateral floating member 22 and the other end 26b coupled to one later side of the body 10. Each length variable member 26 may be configured to retract when the floating members 22 pivot upwards to close the outlet 14 and to expand when the floating members 22 pivot downwards to open the outlet 14.

In this connection, the length variable member 26 may include an elastic member or stretchable member or foldable member or wrinkle-type flexible member, etc.

In one embodiment, as shown in FIG. 4B, the guide 24 may include a guide plate 24a contacting a number of the floating members 22 to guide the sewage discharge, and both side blocking portions 24b vertically upwardly protruding from the guide plate 24a at both side ends thereof respectively to guide the sewage discharge, and both length variable members 26, each member having one end 26a coupled to one lateral side of the guide plate 24a and the other end 26b coupled to one lateral side of the body 10. The length variable member may be configured to retract when the guide plate 24a pivots upwards to close the outlet 14 and to expand when the guide plate 24a pivots downwards to open the outlet 14.

In this connection, the length variable member 26 may cover the side blocking portions 24b of the guide 24 to suppress contaminant invasion.

In this connection, the length variable member 26 may include an elastic member or stretchable member or foldable member or wrinkle-type flexible member, etc.

In this way, in the present disclosure, using each length variable member 26 and each side blocking portion 24b in each lateral side of the door, the door 20 may be easily opened or closed and, at the same time, the contaminants may be prevented from entering into between the door 20 and body 10.

Examples of various embodiments are illustrated in the accompanying drawings and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

REFERENCE NUMERALS

10: body
12: inlet
14: outlet
18: seat groove
20: door
22: floating members
24: guide
26: length variable member
30: coupling member
50: contaminant storage
52: partition wall
54: support walls

What is claimed is:

1. A powerless back-flow prevention apparatus comprising:
   a body having a water inlet at a front thereof, a water outlet at a rear thereof, and a length-wise water channel there between;
   a door pivotally coupled to the body at the rear thereof to open or close the outlet,
   wherein the door comprises:
   a number of floating members arranged spacedly with each other, each floating member being configured to generate a floating force using a back-flow of water toward the outlet; and
   a guide disposed on the floating members to pivot upwards via the floating force to close the outlet, and to pivot downwards via a gravity in an absence of the water back-flow to open the outlet, and, then to guide the water from the outlet,
   wherein the guide comprises:
   a guide plate disposed on the floating members to guide the water from the outlet; and
   side blocking plates extending upwards from the guide plate at both side ends thereof respectively to guide the water from the outlet, wherein the apparatus further comprises a contaminant storage to collect therein external contaminants.

2. The apparatus of claim 1, wherein the floating members are equidistantly spaced from each other.

3. The apparatus of claim 1, wherein the floating members have the same size.

4. The apparatus of claim 1, wherein a shock buffer is disposed between adjacent floating members.

5. The apparatus of claim 1, wherein each floating member has an empty space therein.

6. The apparatus of claim 1, wherein the guide plate and the side blocking plates are monolithic.

7. The apparatus of claim 1, wherein the guide further comprises length variable members, wherein each length variable member has a first side coupled to one lateral side of the guide plate, and a second side opposite the first side, coupled to one lateral side of the body, wherein each length variable member is configured to retract when the guide plate closes the outlet and to expand when the guide plate opens the outlet.

8. The apparatus of claim 1, wherein the inlet has an inlet plane normal to the length-wise sewage channel, and the outlet has an outlet plane tilted relative to the length-wise water channel in a predetermined angle, wherein the inlet portion has an edge having a coupling member disposed along the edge, wherein the coupling member has coupling holes formed therein.

9. The apparatus of claim 1, wherein each floating member has a floating-force generation material filled therein.

10. The apparatus of claim 1, wherein the guide plate is separate from the side blocking plates.

* * * * *